United States Patent
Kim et al.

(10) Patent No.: US 12,367,599 B2
(45) Date of Patent: Jul. 22, 2025

(54) PLANAR SURFACE DETECTION APPARATUS AND METHOD

(71) Applicant: Samsung Electronics Co., Ltd., Suwon-si (KR)

(72) Inventors: Seungeon Kim, Icheon (KR); Hyun Sung Chang, Seoul (KR); Wonhee Lee, Yongin-si (KR); Seokhwan Jang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 17/698,577

(22) Filed: Mar. 18, 2022

(65) Prior Publication Data
US 2023/0132106 A1    Apr. 27, 2023

(30) Foreign Application Priority Data
Oct. 27, 2021 (KR) .................. 10-2021-0144225

(51) Int. Cl.
G06T 7/55 (2017.01)
G06N 3/045 (2023.01)
G06N 3/08 (2023.01)

(52) U.S. Cl.
CPC .............. *G06T 7/55* (2017.01); *G06N 3/045* (2023.01); *G06N 3/08* (2013.01); *G06T 2207/20081* (2013.01); *G06T 2207/20084* (2013.01); *G06T 2207/20224* (2013.01); *G06T 2207/20228* (2013.01)

(58) Field of Classification Search
None
See application file for complete search history.

(56) References Cited

U.S. PATENT DOCUMENTS 11,830,156 B2 * 11/2023 Xu ..................... G06T 19/006
2012/0250978 A1    10/2012 Taylor
2021/0150805 A1     5/2021 Stekovic et al.
(Continued)

FOREIGN PATENT DOCUMENTS

CN    102682477 A     9/2012
CN    110458805 A    11/2019
CN    113011359 A     6/2021
(Continued)

OTHER PUBLICATIONS

Yang, Zhenpei, et al. "StruMonoNet: Structure-Aware Monocular 3D Prediction." *Proceedings of the IEEE/CVF Conference on Computer Vision and Pattern Recognition* 2021 (10 pages in English).
(Continued)

*Primary Examiner* — Vikkram Bali
(74) *Attorney, Agent, or Firm* — NSIP Law

(57) ABSTRACT

Provided is a method and apparatus for detecting a planar surface, the method including acquiring, based on a pixelwise disparity of an input image estimated in a first network, a pixelwise plane parameter of the input image, determining a pixelwise segment matching probability of the input image based on a second network trained to perform a segmentation of an image, acquiring a segment-wise plane parameter based on the pixelwise plane parameter and the pixelwise segment matching probability, and detecting a planar surface in the input image based on the segment-wise plane parameter.

20 Claims, 9 Drawing Sheets

(56) References Cited

U.S. PATENT DOCUMENTS

2022/0036118 A1* 2/2022 Gupta .............. G06V 10/145
2022/0036573 A1   2/2022 Kim et al.

FOREIGN PATENT DOCUMENTS

| KR | 10-2021-0056540 A | 5/2021 |
| KR | 10-2022-0014678 A | 2/2022 |
| KR | 10-2023-0070872 A | 5/2023 |
| WO | WO 2020/091096 A1 | 5/2020 |

OTHER PUBLICATIONS

Kluger, Florian, et al. "Cuboids Revisited: Learning Robust 3D Shape Fitting to Single RGB Images." *Proceedings of the IEEE/CVF Conference on Computer Vision and Pattern Recognition* 2021 (10 pages in English).

Zhao, Chaoqiang et al., "Monocular Depth Estimation Based on Deep Learning: An Overview," arXiv:2003.06620v2, 2020, (14 Pages in English).

Lee, Jin Han et al., "From Big to Small: Multi-Scale Local Planar Guidance for Monocular Depth Estimation," arXiv:1907.10326v6, Sep. 2021, (11 Pages in English).

Extended European Search Report Issued on Oct. 24, 2022, in counterpart European Patent Application No. 22169094.4 (10 Pages in English).

* cited by examiner

PLANAR SURFACE DETECTION APPARATUS AND METHOD

CROSS-REFERENCE TO RELATED APPLICATIONS

This application claims the benefit under 35 USC § 119(a) of Korean Patent Application No. 10-2021-0144225, filed on Oct. 27, 2021, in the Korean Intellectual Property Office, the entire disclosure of which is incorporated herein by reference for all purposes.

BACKGROUND

1. Field

The following description relates to a method and apparatus for detecting a planar surface.

2. Description of Related Art

A planar surface is an important geometric feature of an image and used in various computer-vision fields such as scene understanding, image reconstruction, and object recognition. Various methods based on depth information of an image have been developed to detect a planar surface in the image. In addition, with the development of deep learning technology, various methods for detecting a planar surface in an image using a neural network are being developed. Using training data including depth information corresponding to an image, a normal vector, or a ground truth label for a planar surface, a neural network for plane detection may be implemented based on a supervised learning scheme. However, it is difficult to acquire image data including the ground truth label, and there is a limitation in applying to a real environment having no ground truth label.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of detecting a planar surface, the method including acquiring, based on a pixelwise disparity of an input image estimated in a first network, a pixelwise plane parameter of the input image, determining a pixelwise segment matching probability of the input image based on a second network trained to perform a segmentation of an image, acquiring a segment-wise plane parameter based on the pixelwise plane parameter and the pixelwise segment matching probability, and detecting a planar surface in the input image based on the segment-wise plane parameter.

The detecting of the planar surface in the input image may include acquiring pixelwise segment clustering information based on the pixelwise segment matching probability, and detecting the planar surface in the input image based on the segment-wise plane parameter and the pixelwise segment clustering information.

The acquiring of the segment-wise plane parameter for each segment in the input image may include obtaining, based on the second network, a weighted sum of the pixelwise plane parameter based on the pixelwise segment matching probability corresponding to the corresponding segment, and acquiring a plane parameter of the corresponding segment based on the weighted sum of the pixelwise plane parameter.

The first network and the second network may be trained based on at least one of a first loss associated with a probability that each pixel matches each segment, which is calculated based on a probability distribution of a plane parameter corresponding to each segment clustered based on the second network, or a second loss associated with a difference between a first image and an image obtained by converting a second image corresponding to the first image based on a disparity estimated in the first network to correspond to the first image.

The acquiring of the pixelwise plane parameter may include determining the pixelwise disparity of the input image based on the first network, and acquiring the pixelwise plane parameter including a normal vector and distance information from the pixelwise disparity based on an intrinsic parameter of a camera that captures the input image.

In another general aspect, there is provided a learning method of a plane detection model, the learning method including acquiring a pixelwise plane parameter of a first image included in training data based on a pixelwise disparity of the first image acquired by applying the first image to a first network, determining a pixelwise segment matching probability of the first image by applying the first image to a second network, and training the first network and the second network based on a first loss associated with a probability that each pixel of the first image matches each segment, which is calculated based on the pixelwise plane parameter of the first image and the pixelwise segment matching probability of the first image.

The probability that each pixel of the first image corresponds to each segment is calculated based on the pixelwise plane parameter and a probability distribution of plane parameters corresponding to a number of segments.

The probability distribution of the plane parameters corresponding to the number of segments may include a representative value of the plane parameters corresponding to the segments calculated based on the pixelwise segment matching probability and the pixelwise plane parameter, and a variance of the plane parameters corresponding to the segments calculated based on the pixelwise segment matching probability, the pixelwise plane parameter, and the representative value of the plane parameters corresponding to the segments.

The training of the first network and the second network may include converting a second image captured at a different viewpoint from that of the first image based on a depth estimated to correspond to the first image in the first network, and training the first network and the second network based on the first loss and a second loss associated with a difference between the first image and an image obtained through the converting of the second image.

The training data may include at least one of the first image corresponding to a first monocular image of a stereo image and a second image corresponding to a second monocular image of the stereo image, or the first image corresponding to a first frame of a video image and a second image corresponding to a second frame of the video image.

The acquiring of the pixelwise plane parameter may include estimating the pixelwise disparity of the first image by applying the first image to the first network, and acquiring the pixelwise plane parameter including a normal vector and distance information from the pixelwise disparity based on an intrinsic parameter of a camera that captures the first image.

In another general aspect, there is provided an apparatus for detecting a planar surface, the apparatus including a processor configured to acquire, based on a pixelwise disparity of an input image estimated in a first network, a pixelwise plane parameter of the input image, determine a pixelwise segment matching probability of the input image based on a second network trained to perform a segmentation of an image, acquire a segment-wise plane parameter based on the pixelwise plane parameter and the pixelwise segment matching probability, and detect a planar surface in the input image based on the segment-wise plane parameter.

The processor may be configured to acquire pixelwise segment clustering information based on the pixelwise segment matching probability, and detect the planar surface in the input image based on the segment-wise plane parameter and the pixelwise segment clustering information.

The processor may be configured to obtain, based on the second network, a weighted sum of the pixelwise plane parameter based on the pixelwise segment matching probability corresponding to the corresponding segment, and acquire a plane parameter of the corresponding segment based on the weighted sum of the pixelwise plane parameter.

The first network and the second network may be trained based on at least one of a first loss associated with a probability that each pixel matches each segment, which is calculated based on a probability distribution of a plane parameter corresponding to each segment clustered based on the second network, or a second loss associated with a difference between a first image and an image obtained by converting a second image corresponding to the first image based on a disparity estimated in the first network to correspond to the first image.

The processor may be configured to determine the pixelwise disparity of the input image based on the first network, and acquire the pixelwise plane parameter including a normal vector and distance information from the pixelwise disparity based on an intrinsic parameter of a camera that captures the input image.

In another general aspect, there is provided an apparatus for detecting a planar surface, the apparatus including a memory storing a plane detection model including a first network that estimates a disparity of an input image and a second network that performs a segmentation of the input image, wherein the plane detection model is trained based on acquiring a pixelwise plane parameter of a first image included in training data based on a pixelwise disparity of the first image acquired by applying the first image to the first network, determining a pixelwise segment matching probability of the first image by applying the first image to the second network, and training the first network and the second network based on a first loss associated with a probability that each pixel of the first image matches each segment, which is calculated based on the pixelwise plane parameter of the first image and the pixelwise segment matching probability of the first image.

The training of the first network and the second network included in the learning method of the plane detection model may include converting a second image captured at a different viewpoint from that of the first image based on a depth estimated to correspond to the first image in the first network, and training the first network and the second network based on the first loss and a second loss associated with a difference between the first image and an image obtained through the converting of the second image.

The apparatus may include a processor configured to apply an input image to the first network and acquire a pixelwise plane parameter of the input image based on a pixelwise disparity of the input image estimated in the first network, apply the input image to the second network and acquire a pixelwise segment matching probability of the input image estimated in the second network, acquire a segment-wise plane parameter based on the pixelwise plane parameter and the pixelwise segment matching probability, and detect a planar surface included in the input image based on the segment-wise plane parameter.

Other features and aspects will be apparent from the following detailed description, the drawings, and the claims.

Figure 1:
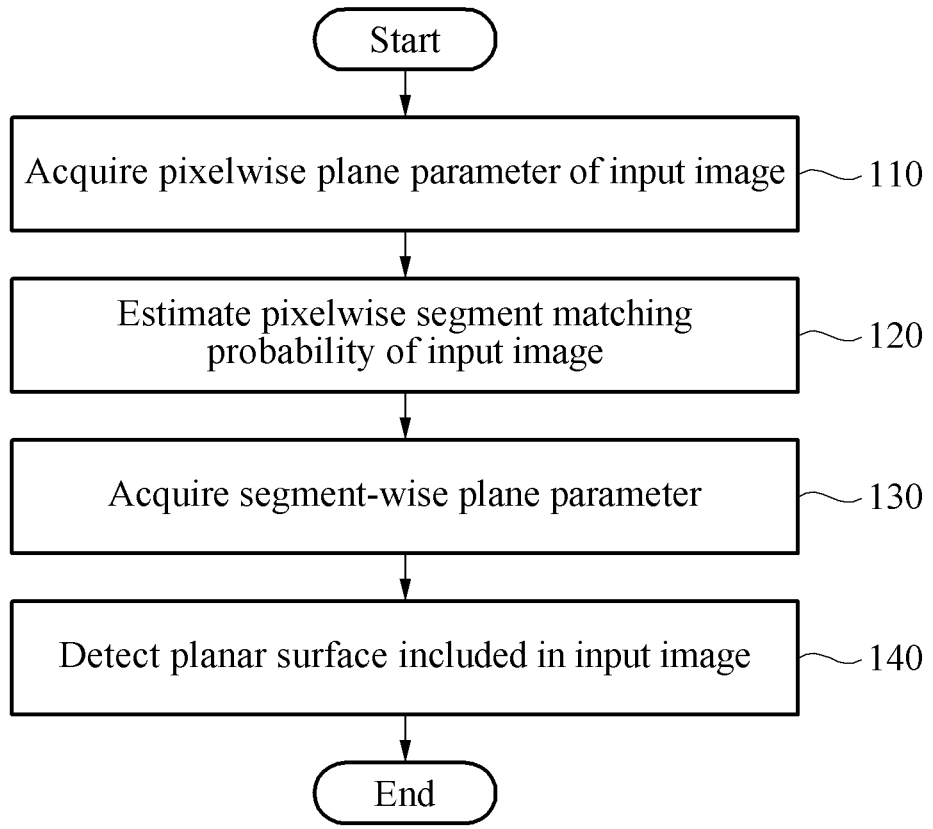
FIG. 1 is a flowchart illustrating an example of a method of detecting a planar surface.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an example of a method of detecting a planar surface. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

Referring to FIG. 1, a method of detecting a planar surface may include operation 110 of acquiring a pixelwise plane parameter of an input image, operation 120 of estimating or determining a pixelwise segment matching probability of the input image, operation 130 of acquiring a segment-wise plane parameter, and operation 140 of detecting a planar surface included in the input image.

Detecting the planar surface may indicate detecting different planar surfaces or surfaces forming an object that is included in an image. A planar surface to be detected may include not only a perfect plane having zero curvature at all points according to mathematical definition, but also a plane-like plane having some degree of curvature. For example, referring to FIG. 2, in a case of an image 200 including a cuboid placed on a floor surface as a subject, a planar surface 210 corresponding to the floor surface, a first planar surface 220 forming an object, a second planar surface 230 forming the object, and a third planar surface 240 forming the object may be detected through a plane detection.

Operation 110 may include an operation of acquiring a pixelwise plane parameter of an input image based on a pixelwise disparity of the input image estimated in a first network.

The first network may include a neural network trained to estimate a disparity or depth of an input image. In an example, the input image may include a monocular image. The monocular image may be an image captured at a single viewpoint and correspond to an image that does not include depth information or disparity information. In other words, the first network may include a neural network trained to estimate a disparity or depth of an image by receiving a monocular image that does not include depth information.

A depth of an image may correspond to a distance between a subject projected onto pixels included in the image and a camera that captures the image. The depth may be acquired from a disparity corresponding to a distance between subjects in two images captured by two cameras separated by a distance of a base line. A depth r may be calculated from a disparity d, a focal length f of a camera lens, and a base line b according to Equation 1.

$$r = f \times \frac{b}{d} \qquad \text{[Equation 1]}$$

As shown above, since the disparity and the depth have an inverse relationship, estimating the disparity may indicate estimating the depth.

A plane parameter may be a parameter for specifying a planar surface and include, for example, information on a distance from a reference point and a normal vector of the planar surface. For example, in a three-dimensional (3D) coordinate system having a position of a camera as an origin, a plane parameter for specifying a planar surface corresponding to "ax+by+cz+d=0" may include a vector [a, b, c, d] including d corresponding to information on a distance between an origin and a normal vector (a, b, c).

The pixelwise plane parameter may be a plane parameter of each pixel included in an image and include information on a distance between a reference point and a normal vector of a planar surface to which the pixel belongs.

Operation 110 of acquiring the pixelwise plane parameter may include an operation of estimating a pixelwise disparity of the input image based on the first network and an operation of acquiring a pixelwise plane parameter including distance information and a normal vector from the pixelwise disparity based on an intrinsic parameter of the camera that captures the input image. The intrinsic parameter of the camera may be a value related to internal settings of the camera and include, for example, a focal length of the camera lens and a base line value.

A 3D point cloud of pixels may be calculated using the disparity of pixels estimated in the first network and the intrinsic parameter of the camera. From the point cloud, a distance from a reference point and a normal vector for each pixel may be calculated. In other words, the pixelwise plane parameter may be acquired through a calculation from the pixelwise disparity estimated in the first network and the intrinsic parameter of the camera.

Operation 120 may include an operation of estimating a pixelwise segment matching probability of the input image based on a second network trained to perform an image segmentation.

The second network may include a neural network trained to perform a segmentation of an input image. The segmentation may indicate clustering pixels of an image into a number of groups. Groups or clusters of the pixels clustered through the segmentation may be referred to as segments.

The second network may include a neural network trained to cluster pixels of an image belonging to the same planar surface into the same segment. As described below, the second network may be trained to cluster pixels into a segment belonging to the same planar surface based on a value of the pixelwise plane parameter acquired based on the first network without ground truth data on a segment of a pixel of the image and an output of the second network. In addition, the second network may be trained to cluster pixels into a segment belonging to the same planar surface based on data in which pixelwise additional information is added to a value of the pixelwise plane parameter acquired based on the first network and an output of the second network.

The second network may output the pixelwise segment matching probability of the input image. A segment matching probability of a pixel may include, for each segment, a probability that the pixel matches a corresponding segment or a probability that the pixel is clustered to the corresponding segment. A number of segments may be previously set to be a value. For example, when the number of segments is set to K, a segment matching probability $\gamma^n$ of a pixel n may correspond to a set $\{\gamma_1^n, \gamma_2^n, \ldots, \gamma_K^n\}$ including a probability that the pixel n matches each of K segments.

Two pixels having similar plane parameters may have the same type of segment having a high matching probability. In other words, a plurality of pixels belonging to the same planar surface may have a high probability of matching a segment corresponding to the corresponding planar surface.

At least one of the first network and the second network may be trained based on at least one of a first loss and a second loss. The first loss may include a loss for likelihood defined as a probability of each pixel matching each segment, which is calculated based on a probability distribution of a plane parameter corresponding to each segment clustered based on the second network. The second loss may include a loss for a difference between a first image and an image obtained by converting a second image corresponding to the first image based on the disparity estimated in the first network. A method of training the first network and the second network will be described later.

Operation 130 may include an operation of acquiring a segment-wise plane parameter based on the pixelwise plane parameter and the pixelwise segment matching probability.

Operation 130 of acquiring the segment-wise plane parameter may include an operation of obtaining, to correspond to each segment in the input image based on the second network, a weighted sum of pixelwise plane parameters based on the pixelwise segment matching probability corresponding to the corresponding segment and an operation of acquiring a plane parameter corresponding to the corresponding segment based on the weighted sum of the plane parameters.

The operation of obtaining the weighted sum of the pixelwise plane parameters may include an operation of obtaining a weighted sum of plane parameters of pixels using a probability of pixels matching a segment as a weight. For example, as shown in Equation 2, a value obtained by multiplying a plane parameter of every pixel by a probability of matching a segment k may be acquired as a plane parameter $y_k$ of the segment k.

$$y_k = \sum_{n=1}^{N} \gamma_k^n x^n \qquad \text{[Equation 2]}$$

In Equation 2, n denotes an index of a pixel and corresponds to a natural number between 1 and N, inclusive, N being a total number of pixels included in an image. $\gamma_k^n$ denotes a probability of the pixel n corresponding to the segment k and may be included in the segment matching probability $\gamma^n$ of the pixel n output by the second network. $x^n$ denotes a plane parameter of the pixel n and may correspond to a value acquired based on the first network.

To normalize a segment-wise plane parameter, a value obtained by multiplying $y_k$ by $1/N_k$ according to Equation 1 may be used as a plane parameter of the segment k. $N_k$ may be defined as shown in Equation 3.

$$N_k = \sum_{n=1}^{N} \gamma_k^n \qquad \text{[Equation 3]}$$

The method of acquiring the segment-wise plane parameter based on the weighted sum of plane parameters of all pixels according to Equation 2 is merely an example of the method of acquiring the segment-wise plane parameter based on the pixelwise plane parameter and the pixelwise segment matching probability, and the method of acquiring the segment-wise plane parameter is not limited to the method according to Equation 2.

As an example, a plane parameter of a segment may be determined based on a simple sum or a weighted sum of plane parameters of pixels having a maximal probability of matching the segment among segment matching probabilities. For example, the plane parameter of the segment k may be determined based on an average according to a simple sum of plane parameters associated with the pixel n having a maximum value of $\gamma_k^n$ corresponding to the segment k among $\gamma^n = \{\gamma_1^n, \gamma_2^n, \ldots, \gamma_k^n\}$ or a weighted sum of probabilities of matching the corresponding segment.

As another example, a plane parameter of a segment may be determined based on a weighted sum of plane parameters of pixels of which probabilities of matching the segment are greater than or equal to a threshold. For example, when the threshold is 0.5, the plane parameter of the segment k may be determined based on a weighted sum of plane parameters of the pixel n having $\gamma_k^n$ of 0.5 or more.

Operation 140 may include an operation of detecting a planar surface included in the input image based on the segment-wise plane parameter. Based on the segment-wise plane parameter, a planar surface corresponding to each segment may be detected from the input image. The segment-wise plane parameter may include information for specifying a planar surface corresponding to each segment and may include, for example, a normal vector of a planar surface corresponding to each segment and information on a distance from a reference point. In other words, by the segment-wise plane parameter, the planar surface corresponding to each segment may be specified in the input image.

Operation 140 of detecting the planar surface included in the input image may include an operation of acquiring pixelwise segment clustering information based on the pixelwise segment matching probability of the input image and an operation of detecting a planar surface included in the input image based on the segment-wise plane parameter and the pixelwise segment clustering information. The pixelwise segment clustering information may include information indicating a segment corresponding to each pixel. Segment clustering information of a pixel may include information indicating a segment having a largest probability of matching the corresponding pixel based on a segment matching probability of the corresponding pixel. For example, when $\gamma_k^n$ corresponding to a probability of matching the segment k is the largest among the segment matching probability $\gamma^n = \{\gamma_1^n, \gamma_2^n, \ldots, \gamma_K^n\}$ of the pixel n, segment clustering information of the pixel may include information indicating the segment k. In other words, the segment clustering information of pixels included in the input image may be provided based on the pixelwise segment clustering information and information on a planar surface corresponding to each segment may be provided based on the segment-wise plane parameter, so that the planar surface included in the input image is detected.

Figure 3:
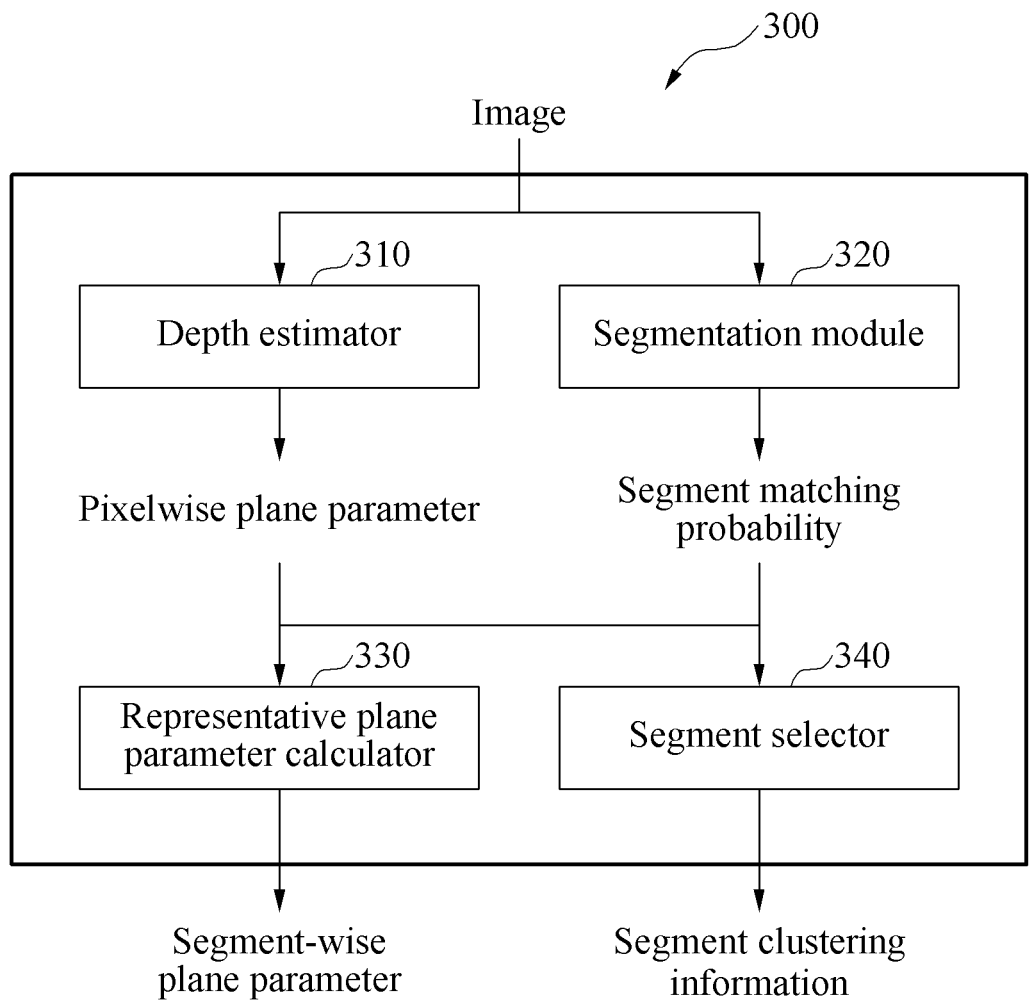
FIG. 3 illustrates an example of a framework of a plane detection model.

FIG. 3 illustrates an example of a framework of a plane detection model.

Referring to FIG. 3, a plane detection model 300 is a model that receives an image and outputs a segment plane parameter and segment clustering information as a result of plane detection, and may correspond to a model that performs operations of the method of detecting the planar surface described with reference to FIG. 1. As described above, an input image may include a monocular image.

The plane detection model 300 may include a depth estimator 310, a segmentation module 320, a representative plane parameter calculator 330, and a segment selector 340. The modules 310 through 340 included in the plane detection model 300 are arbitrarily divided according to logical operations performed in the plane detection model 300 for convenience of explanation, and the structure of the plane detection model 300 is not limited thereto. For example, the plane detection model 300 may be implemented as a device including at least one processor to perform an operation of the plane detection model 300. A configuration of the device in which the plane detection model is implemented will be described below in greater detail.

The depth estimator 310 may correspond to a module that receives an image and outputs a pixelwise plane parameter of the input image. As described above, a plane parameter of a pixel is a parameter for specifying a planar surface corresponding to the pixel, and may include a normal vector of the planar surface corresponding to the pixel and information on a distance from a reference point. The depth estimator 310 may include a first network that is a neural network for estimating a disparity for each pixel of the input image and may include a module that calculates a pixelwise plane parameter based on the disparity output from the first network. The depth estimator 310 may calculate a pixelwise disparity of an image estimated in the first network and a point cloud of each pixel based on an intrinsic parameter of a camera that captures an input image, and perform an operation of calculating a distance from a reference point and a normal vector based on a relationship of each point with a point adjacent to the corresponding point.

The segmentation module 320 may correspond to a module that receives an image and outputs a pixelwise segment matching probability of the input image. The segmentation module 320 may include a second network trained to receive an image and output a pixelwise segment matching probability of the input image. As described above, a segment matching probability of a pixel may include, for each segment, a probability that the pixel matches the corresponding segment or a probability that the pixel is clustered to the corresponding segment. The segmentation module 320 may perform an operation of calculating a probability of each pixel matching a segment of the input image.

The representative plane parameter calculator 330 may receive the pixelwise plane parameter and the pixelwise segment matching probability and output the segment-wise plane parameter. The representative plane parameter calculator 330 may calculate a representative value of plane parameters of pixels corresponding to each segment, for each segment in the input image based on the second network using results output from the depth estimator 310 and the segmentation module 320. For example, as described above, a plane parameter of a segment may be determined based on a value corresponding to a weighted sum of plane parameters of pixels based on probabilities of the pixels matching the corresponding segment as a weight. In addition, the plane parameter of the segment may also be determined based on a simple sum or a weighted sum of plane parameters of pixels having a largest probability of matching the corresponding segment among segment matching probabilities.

The segment selector 340 may receives the pixelwise segment matching probability and output pixelwise segment clustering information as a result of segmentation. The segment selector 340 may output information indicating a segment corresponding to a maximum value of a pixelwise probability of belonging to each segment, as segment clustering information of the corresponding pixel. The segment selector 340 may include a max function, extract a maximum value from the input pixelwise segment matching probability, and output information indicating a segment corresponding to the maximum value.

Figure 2:
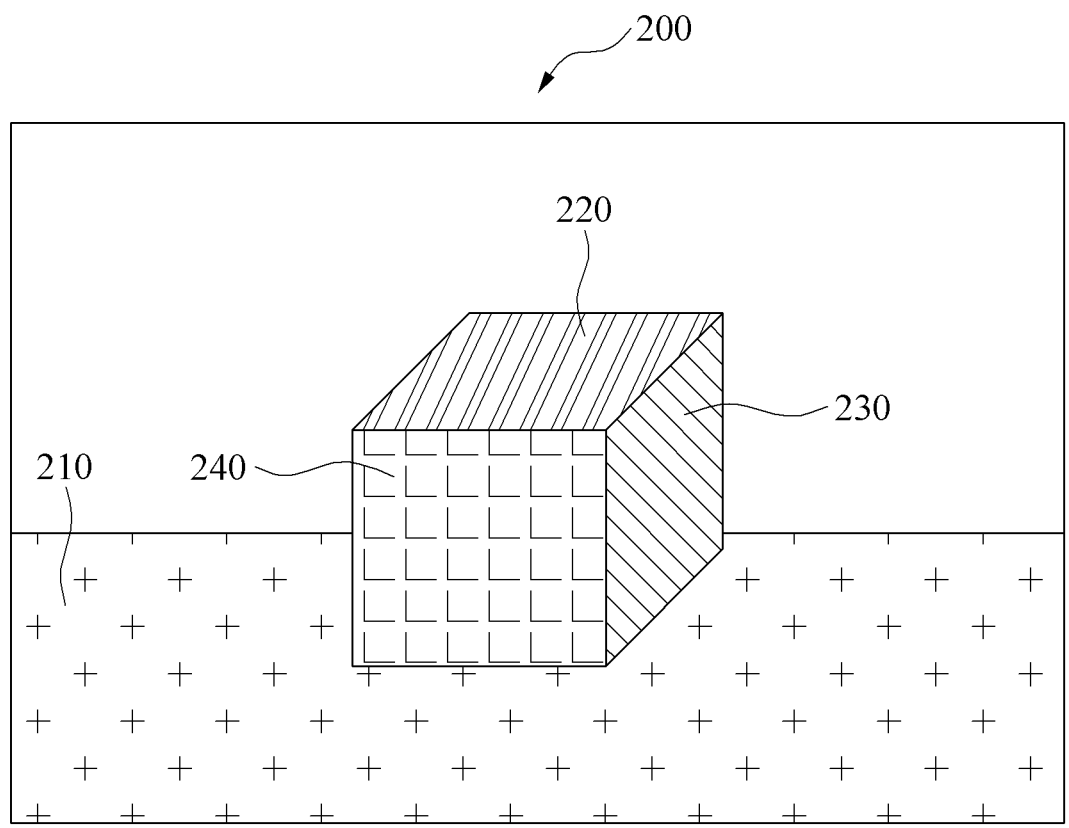
FIG. 2 illustrates an example of detecting a planar surface.
Figure 4:
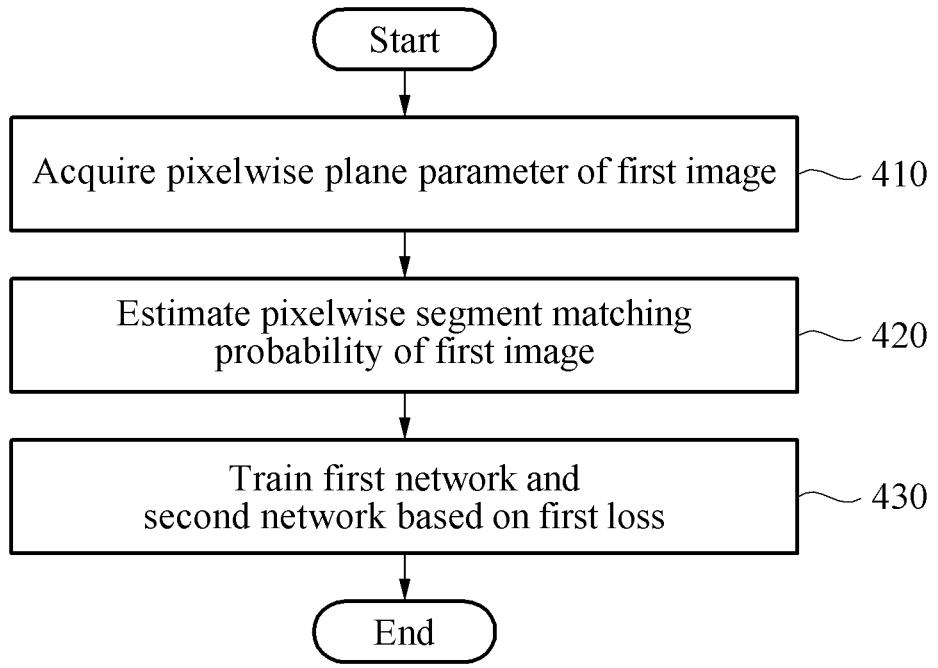
FIG. 4 is a diagram illustrating an example of a learning method of a plane detection model.

FIG. 4 is a diagram illustrating an example of a learning method of a plane detection model. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

A plane detection model may correspond to the plane detection model 300 described with reference to FIG. 3. The learning method of the plane detection model may correspond to a learning method of a neural network included in the plane detection model. In addition, as described above, the neural network included in the plane detection model may include a first network and a second network.

Referring to FIG. 4, the learning method of the plane detection model may include operation 410 of acquiring a pixelwise plane parameter of a first image, operation 420 of estimating a pixelwise segment matching probability of the first image, and operation 430 of training the first network and the second network based on a first loss.

In an example, training data may include a first image corresponding to a first monocular image of a stereo image and a second image corresponding to a second monocular image of the stereo image. For example, when the first image is a left monocular image of a stereo image, the second image may correspond to a right monocular image of the same stereo image.

In another example, training data may include a first image corresponding to a first frame of a video image and a second image corresponding to a second frame of the video image. In other words, the first image and the second image may correspond to images corresponding to different frames of the same video image.

Operation 410 may include an operation of acquiring a pixelwise plane parameter of the first image based on a pixelwise disparity of the first image acquired by applying the first image included in the training data to the first network. Operation 410 may correspond to operation 110 of FIG. 1 and correspond to an operation performed in the depth estimator 310 of FIG. 3.

Operation 410 of acquiring the pixelwise plane parameter may include an operation of estimating a pixelwise disparity of the first image by applying the first image to the first network and an operation of acquiring a pixelwise plane parameter including a normal vector and distance information from the pixelwise disparity based on an intrinsic parameter of a camera that captures the first image.

Operation 420 may include an operation of estimating a pixelwise segment matching probability of the first image by applying the first image to the second network. Operation 420 may correspond to operation 120 of FIG. 1 and correspond to an operation performed in the segmentation module 320 of FIG. 3.

Operation 430 may include an operation of training the first network and the second network based on a first loss associated with a probability that each pixel of the first image matches each segment, which is calculated based on the pixelwise plane parameter of the first image and the pixelwise segment matching probability of the first image.

The first loss may correspond to a likelihood loss used in an unsupervised learning scheme for clustering. The first network and the second network may be trained using the unsupervised learning scheme based on the first loss.

The likelihood may be defined as a probability that each pixel of the first image matches each segment. The probability that each pixel of the first image matches each segment may be calculated based on a probability distribution of plane parameters corresponding to a number of segments and the pixelwise plane parameter. For the second network, a number of segments clustered by performing a segmentation may be set to a predetermined value.

The probability distribution of the plane parameters corresponding to the number of segments may include a representative value of the plane parameters corresponding to the segments and a variance of the plane parameters corresponding to the segments. The representative value of the plane parameters corresponding to the segments may be calculated based on the pixelwise segment matching probability and the pixelwise plane parameter. The variance of the plane parameters corresponding to the segments may be calculated based on the representative value of the plane parameters corresponding to the segments and the pixelwise segment matching probability, and the pixelwise plane parameter and the representative value of the plane parameters corresponding to the segments.

The likelihood that is the probability that each pixel of the first image matches each segment may be calculated based on data obtained by adding pixelwise additional information to the pixelwise plane parameter and a probability distribution related to additional information and the pixelwise plane parameter corresponding to each of the number of segments. The data obtained by adding pixelwise additional information to the pixelwise plane parameter may include data obtained by adding pixel-related information extracted for each pixel to the pixelwise plane parameter using a technique such as a positional encoding. The pixelwise additional information may include, for example, various types of information to be extracted for each pixel such as a coordinate value in an image for each pixel and a feature extracted by a deep learning model for each pixel.

For example, the likelihood may be acquired based on data [a, b, c, d, x, y] obtained by adding a coordinate value (x, y) in an image for each pixel to a pixelwise plane parameter [a, b, c, d]. In this example, a representative value of coordinate values of pixels respectively corresponding to segments may be additionally defined, and a new likelihood is calculated based on the representative value. In an example, the first loss associated with the likelihood may be calculated by applying a similarity of coordinate values for each pixel as well as a similarity of the pixelwise plane parameters. A further description will be given of the first loss below in greater detail.

Operation 430 of training the first network and the second network may include an operation of training the first network and the second network based on the first loss and a second loss. For example, a weight of the first network and the second network may be updated such that a sum of the first loss and the second loss is reduced.

The second loss may correspond to a loss associated with a difference between the first image and an image obtained by converting the second image corresponding to the first image based on the disparity estimated in the first network to correspond to the first image. For example, operation 430 of training the first network and the second network may include an operation of converting the second image captured at a different viewpoint from that of the first image based on a depth estimated in the first network to correspond to the first image and an operation of training the first network and the second network based on the first loss and the second loss associated with the difference between the converted image and the first image. A further description will be given of the second loss below in greater detail.

Figure 5:
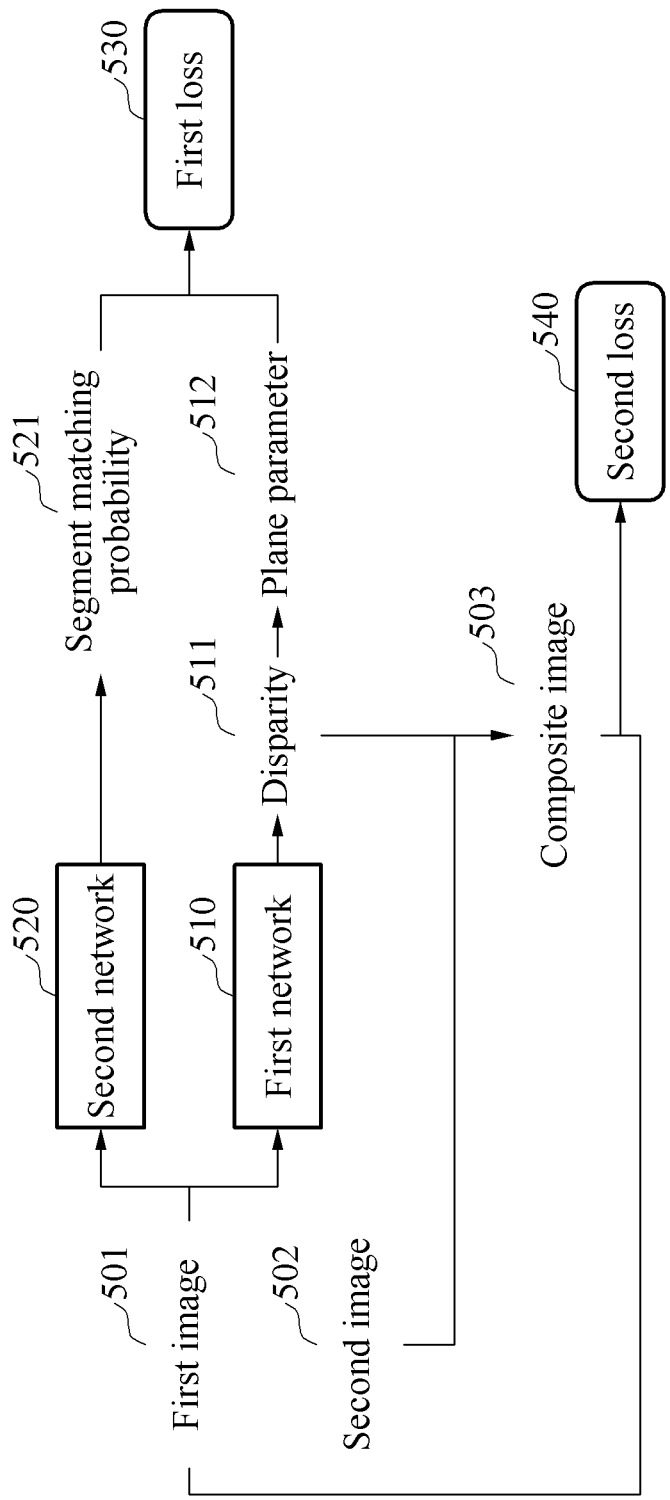
FIG. 5 illustrates an example of a loss for learning a plane detection model.

FIG. 5 illustrates an example of a loss for learning a plane detection model.

Referring to FIG. 5, a first loss 530 may be defined based on a pixelwise plane parameter 512 acquired from a pixelwise disparity 511 of an image that is an output of the first network 510 and a pixelwise segment matching probability 521 that is an output of a second network 520. As described above, the first loss 530 may be defined based on data obtained by adding pixelwise additional information to the pixelwise plane parameter 512. For ease of description, however, the following description will be given based on an example in which the first loss is defined based on the pixelwise plane parameter 512.

For example, the first loss 530 may be determined based on a likelihood defined as a probability that each pixel matches each segment under an assumption that a plane parameter of a pixel corresponding to each segment follows a Gaussian distribution. The likelihood may be defined as shown in Equation 4.

$$\ln p(x|\pi, \mu, \Sigma) = \sum_{n=1}^{N} \ln\left(\sum_{k=1}^{K} \pi_k \mathcal{N}(x^n|\mu_k, \Sigma_k)\right) \quad \text{[Equation 4]}$$

In Equation 4, k denotes an index of a segment and corresponds to a natural number between 1 and K, K being a number of segments. n denotes an index of a pixel and corresponds to a natural number between 1 and N, inclusive, N being a total number of pixels included in an image. $\mathcal{N}$ may denote a normal distribution or Gaussian distribution. $x^n$ denotes a plane parameter of the pixel n and may be included in the pixelwise plane parameter 512 acquired based on the first network 510. $\mu_k$ denotes an average or representative value of plane parameters corresponding to the segment k, $\Sigma_k$ denotes a variance of the plane parameters corresponding to the segment k, and m denotes a mixing coefficient. $\mu_k$, $\Sigma_k$, and $\pi_k$ may be defined as shown in Equations 5 through 7, respectively.

$$\mu_k = \frac{1}{N_k} \sum_{n=1}^{N} \gamma_k^n x^n \qquad \text{[Equation 5]}$$

$$\Sigma_k = \frac{1}{N_k} \sum_{n=1}^{N} \gamma_k^n (x^n - \mu_k)(x^n - \mu_k)^T \qquad \text{[Equation 6]}$$

$$\pi_k = \frac{N_k}{N} \text{ with } N_k = \sum_{n=1}^{N} \gamma_k^n \qquad \text{[Equation 7]}$$

In Equations 5 through 7, $\gamma_k^n$ denotes a probability that the pixel n matches the segment k and may be included in the pixelwise segment matching probability 521 output in the second network 520.

For example, when it is assumed that the plane parameter corresponding to each segment follows the Gaussian distribution, a probability of matching each segment may be calculated according to a plane parameter of each pixel based on a variance and an average of the plane parameters corresponding to the respective segments.

The first loss 530 may decrease as the likelihood increases. The first network 510 and the second network 520 may be trained to reduce the first loss 530.

A second loss 540 may correspond to a loss associated with a difference between a composite image 503 and a first image 501. The composite image may correspond to an image synthesized by converting a second image 502 corresponding to the first image 501 based on a disparity estimated in the first network 510 to correspond to the first image 501. The second loss 540 may be defined to decrease as the difference between the composite image 503 and the first image 501 decreases. The first network 510 may be trained to reduce the second loss 540.

The second loss 540 is used for correcting an accuracy of a disparity 511 estimated in the first network 510. The first network 510 may be trained based on a loss based on ground truth data on a disparity of an input image.

Figure 6:
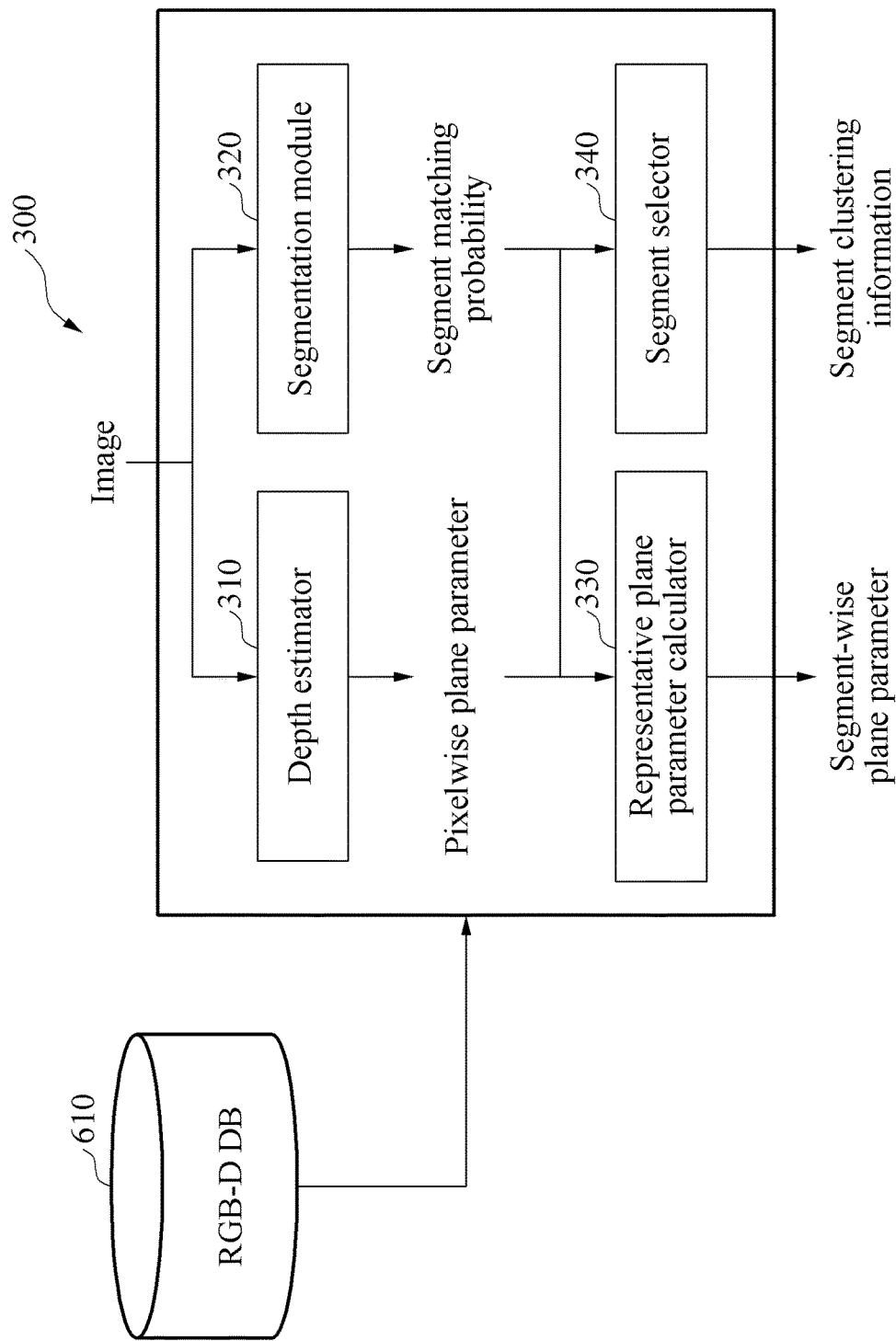
FIG. 6 illustrates an example of a learning method of a plane detection model.

Referring to FIG. 6, to increase an accuracy of a disparity estimation of the first network, a plane detection model 300 may be trained based on an RGB-D image database 610. As described with reference to FIG. 3, the plane detection model 300 may include the depth estimator 310, and the depth estimator 310 may include a first network that is a neural network. In other words, the first network of the plane detection model 300 may be trained based on the RGB-D image database 610.

An RGB-D image may correspond to an image including depth information. The first network may receive the RGB-D image and estimate a depth or disparity of the input image. By comparing a result estimated in the first network and actual depth information of the RGB-D image, the first network may be trained to reduce a difference therebetween. The first network may be trained based on the first loss and a loss defined based on ground truth data associated with a depth instead of the second loss described above. As such, using an image including ground truth data associated with the disparity that is an output of the first network, a loss associated with a difference between the ground truth data and the disparity output from the first network may be defined, so that the first network may be trained based on the loss.

Figure 7:
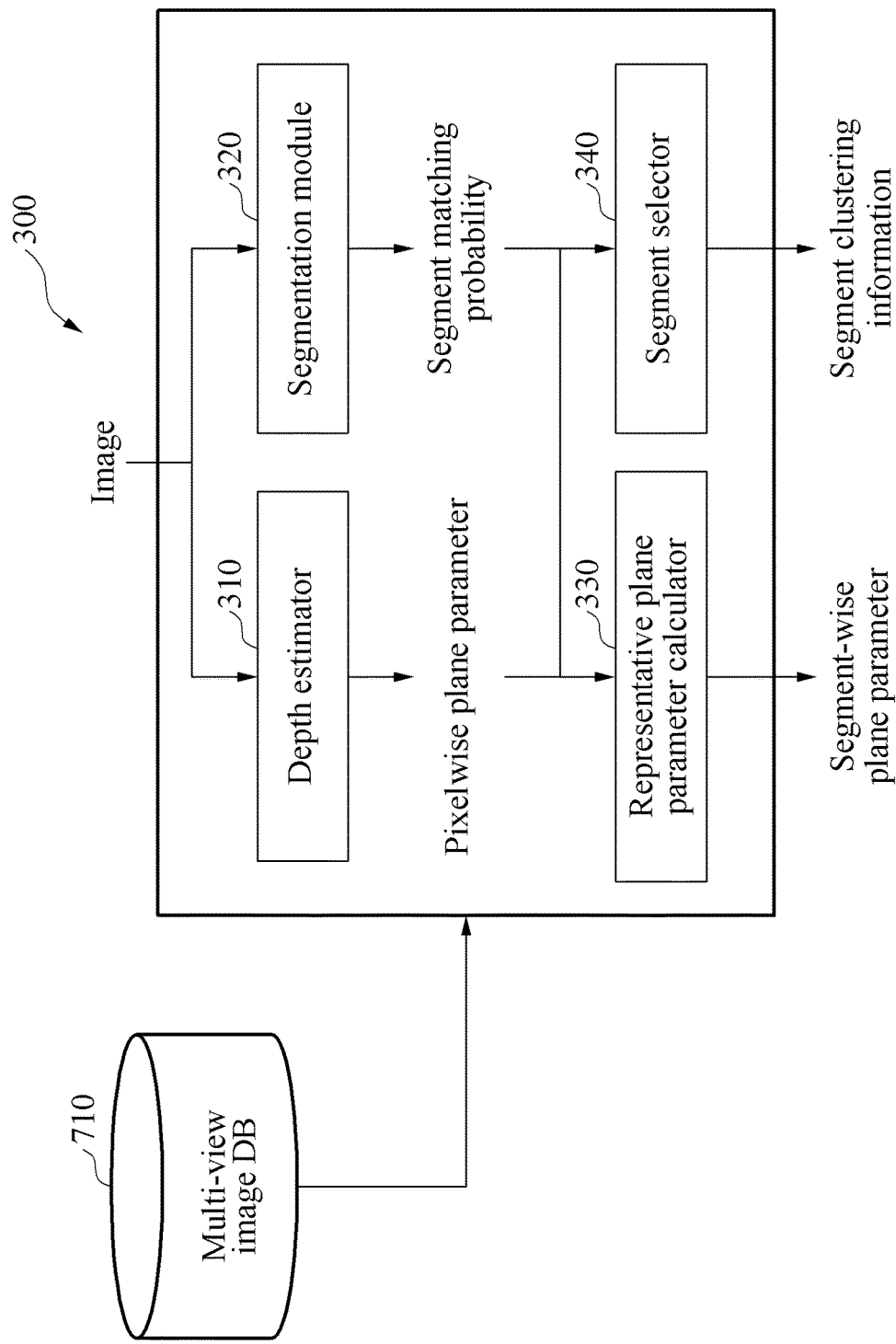
FIG. 7 illustrates an example of a learning method of a plane detection model.

Referring to FIG. 7, to increase an accuracy of disparity estimation of the first network, the plane detection model 300 may be trained based on a multi-view image database 710. As described with reference to FIG. 3, the plane detection model 300 may include the depth estimator 310, and the depth estimator 310 may include the first network that is a neural network. In other words, the first network of the plane detection model 300 may be trained based on the multi-view image database 710.

A multi-view image may include a plurality of images (for example, a stereo image) captured at a plurality of different angles. 3D information on an environment in which the multi-view image is captured may be acquired based on a matching relationship between the plurality of images included in the multi-view image. Based on the acquired 3D information, a more accurate image disparity or depth value may be acquired. The first network may receive the multi-view image and estimate a depth or disparity of the received image. A result estimated in the first network may be compared to depth information calculated based on a matching relationship of the multi-view image, so that the first network may be trained to reduce a difference therebetween.

In an example, the first network and the second network may be simultaneously trained. For example, the first network and the second network may be simultaneously trained based on the first loss and the second loss to reduce a sum of the first loss and the second loss. The second network may use a pixelwise plane parameter of which an accuracy increases as an accuracy of estimation of a disparity that is the output of the first network increases, which may lead to an increase in accuracy of segmentation. The first network may have an effect that a similarity of plane parameters of pixels corresponding to the same segment increases as an accuracy of segmentation that is the output of the second network increases, that is, as clustering is more accurately performed according to a planar surface to which the pixel belongs. Through this, the first network may increase the accuracy of the disparity estimation.

The first network and the second network may be trained in sequence. For example, the first network may be trained first based on the first loss and the second loss, and then the second network may be trained based on the first loss.

Figure 8:
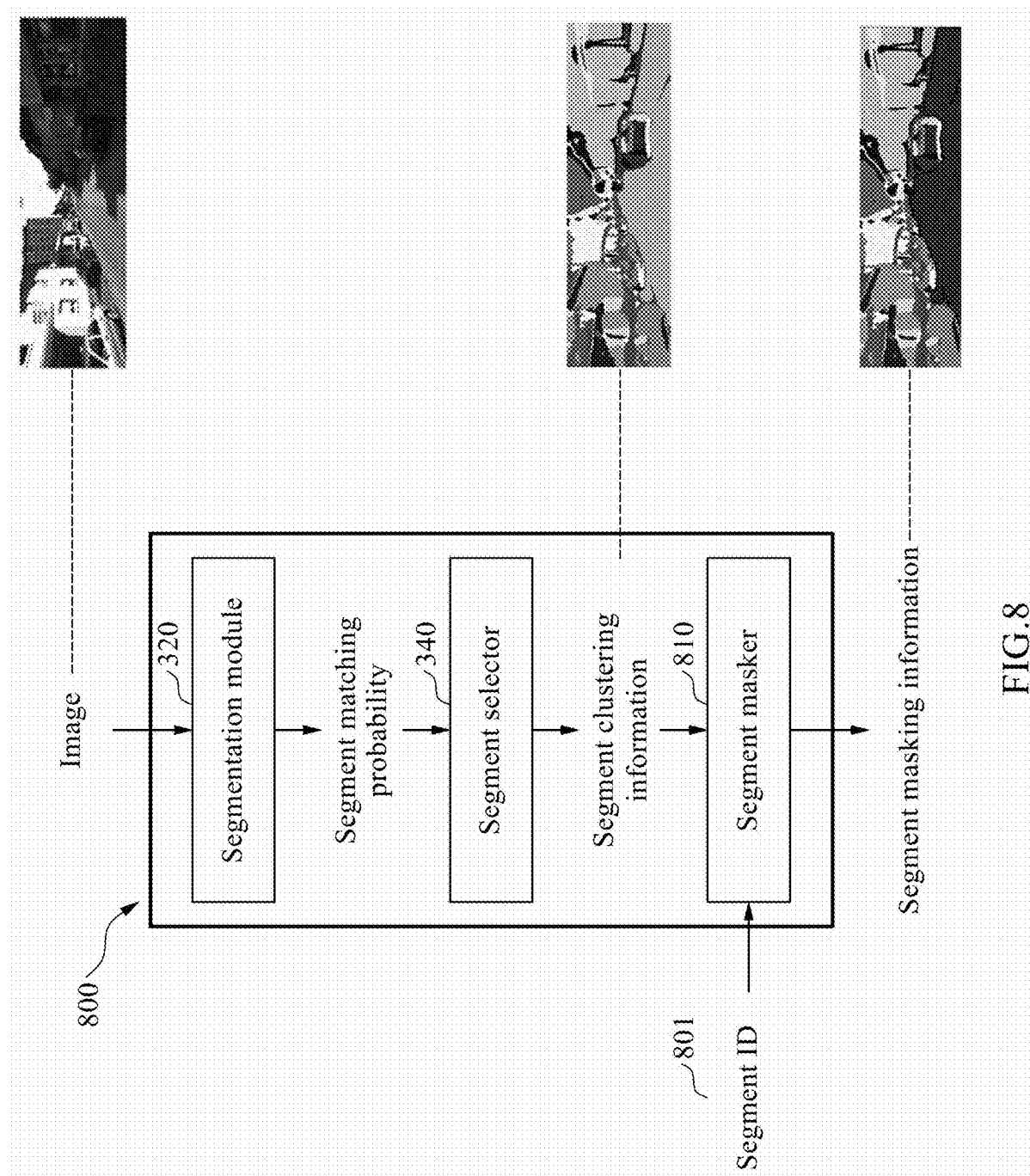
FIG. 8 illustrates an example of a framework of a plane detection model using a trained second network.

FIG. 8 illustrates an example of a framework of a plane detection model using a trained second network.

A second network trained according to the learning method described with reference to FIGS. 4 through 7 may be used for a plane extraction model that extracts a planar surface from an input image. For example, the second network trained together with the first network according to the learning method described with reference to FIGS. 4 through 7 may be used for a plane extraction model for extracting a planar surface corresponding to a segment from an input image.

Referring to FIG. 8, a plane extraction model 800 may correspond to a model that receives an image as an input and outputs segment masking information as a result of plane extraction. The input image may include a monocular image.

The plane extraction is to separate a planar surface from an image. For example, in the plane extraction, a planar surface may be extracted from an image by displaying the planar surface to be distinguished from other parts in the image or outputting information of pixels included in the planar surface.

The plane extraction model 800 may include the segmentation module 320, the segment selector 340, and a segment masker 810. The modules 320, 340, and 810 included in the plane extraction model 800 are arbitrarily divided according to logical operations performed in the plane detection model 300 for convenience of explanation, and the structure of the plane extraction model 800 is not limited thereto. For example, the plane extraction model 800 may be implemented as a device including at least one processor to perform an operation of the plane detection model 300.

The segmentation module 320 and the segment selector 340 may correspond to constituent elements of the plane detection model 300 described with reference to FIG. 3. As described above, the segmentation module 320 may include a trained second network to receive an image and output a pixelwise segment matching probability of the input image. As described above, the segment selector 340 may receive the pixelwise segment matching probability as an input and output pixelwise segment clustering information as a result of segmentation.

The segment masking module 810 may receive a segment ID 801 for indicating a segment and mask or extract a planar surface corresponding to the received segment ID 801 in an input image based on pixelwise segment clustering information. Segment masking information, which is an output of the plane extraction model 800, may include an image showing a planar surface corresponding to a segment ID to be distinguished from other portions in an input image or information on a pixel included in the planar surface corresponding to the segment ID. For example, when the input segment ID indicates a segment corresponding to a floor surface, a portion corresponding to the floor surface in the input image may be displayed to be distinguished from other portions, or information on a pixel corresponding to the floor surface may be output.

The plane extraction model 800 may be used to provide information on a planar surface in various computer vision-based 3D modeling applications. For example, the plane extraction model 800 may be used to extract a planar surface (e.g., a floor surface or a top surface of an object) for placing an AR object in an AR application.

Figure 9:
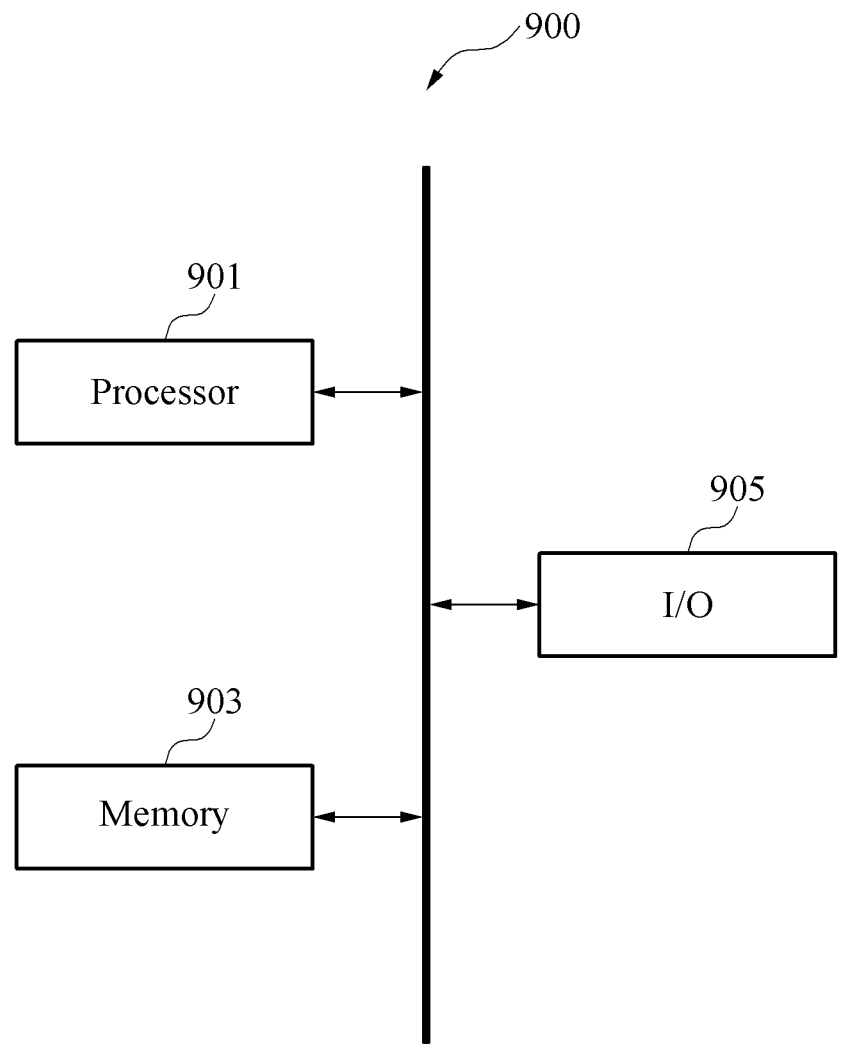
FIG. 9 illustrates an example of a configuration of an apparatus.

FIG. 9 illustrates an example of a configuration of an apparatus.

Referring to FIG. 9, an apparatus 900 may include a processor 901, a memory 903, and an input and output (I/O) device 905. The apparatus 900 may be implemented as, for example, a user device (e.g., a smartphone, a personal computer (PC), a tablet PC, etc.), AR glasses, a sensor, a personal computer (PC), a smart vehicle, a vehicle guidance system, a personal navigation device or portable navigation device (PND), a handheld game console, a home appliance such as a television, a digital television (DTV), a smart television, a refrigerator, and a server.

The apparatus 900 may include the memory 903 in which a plane detection model is recorded. The plane detection model may include the plane detection model described with reference to FIGS. 1 through 7. The memory 903 stores instructions (or programs) executable by the processor 901. For example, the instructions include instructions to perform an operation of the processor 901. In addition, the memory 903 may store various data and programs. The memory 903 may be a volatile memory or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further description regarding the memory 903 is provided below.

The memory 903 may store a program in which the above-described plane detection model is implemented. The processor 901 may execute the program stored in the memory 903 and control the apparatus 900. For example, the processor 901 may acquire, based on a pixelwise disparity of an input image estimated in a first network, a pixelwise plane parameter of the input image, estimate a pixelwise segment matching probability of the input image based on a second network trained to perform a segmentation of an image, acquire a segment-wise plane parameter based on the pixelwise plane parameter and the pixelwise segment matching probability, and detect a planar surface included in the input image based on the segment-wise plane parameter.

The processor 901 may be a data processing device implemented by hardware including a circuit having a physical structure to perform desired operations. For example, the desired operations may include code or instructions included in a program.

For example, the hardware-implemented data processing device may include a microprocessor, a single processor, an independent processors, a parallel processors, a single-instruction single-data (SISD) multiprocessing, a single-instruction multiple-data (SIMD) multiprocessing, a multiple-instruction single-data (MISD) multiprocessing, a multiple-instruction multiple-data (MIMD) multiprocessing, a microcomputer, a processor core, a multi-core processor, a multiprocessor, a central processing unit (CPU), a neural processing unit (NPU), a graphics processing unit (GPU), a tensor processing unit (TPU), a digital signal processor (DSP), a controller and an arithmetic logic unit (ALU), a field-programmable gate array (FPGA), an application-specific integrated circuit (ASIC), a programmable logic unit (PLU), or an application processor (AP). Further description regarding the processor 901 is provided below.

The apparatus 900 may be connected to an external device (e.g., a personal computer, a server, or a network) through the I/O device 905 and exchange data. For example, the apparatus 900 may receive an image through the I/O device 905 and output a result of a plane detection model.

As described above, the plane detection model may include a first network and a second network, which are neural networks. The plane detection model including the first network and the second network may be generated and manufactured by the learning method described with reference to FIGS. 4 through 7.

For example, the plane detection model may be generated or manufactured through an operation of acquiring a pixel-wise plane parameter of a first image included in training data based on a pixelwise disparity of the first image acquired by applying the first image to a first network, an operation of estimating a pixelwise segment matching probability of the first image by applying the first image to a second network, and an operation of training the first network and the second network based on a first loss associated with a likelihood defined as a probability that each pixel of the first image matches each segment, which is calculated based on the pixelwise plane parameter of the first image and the pixelwise segment matching probability of the first image.

The processor 901 may perform at least one operation of the learning method described with reference to FIGS. 4 through 7 and perform an operation of storing, in the memory 903, parameters of the first network and the second network updated in a learning process.

The apparatus 900 may store a program in which the plane detection model described with reference to FIG. 8 is stored. The processor 901 may execute the program stored in the memory 903 and control the apparatus 900. For example, the processor 901 may apply an input image to the second network, acquire a pixelwise segment matching probability of the input image, acquire pixelwise segment clustering information by inputting the acquired pixelwise segment matching probability to a segment selecting model, receive a segment ID for indicating a segment, and mask or extract a planar surface corresponding to the segment ID input in the input image based on the pixelwise segment clustering information.

An aspect provides a technology for detecting a planar surface in an image using a neural network trained based on an unsupervised learning scheme without using ground truth data.

Another aspect provides a neural network learning method for estimating a depth of an image without using ground truth data and segmenting the image in units of planar surfaces using the estimated depth information.

The plane detection model 300, the depth estimator 310, the segmentation module 320, the representative plane parameter calculator 330, the segment selector 340, the segment masker 810, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1 and 3-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the method of detecting a planar surface. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of detecting a planar surface, the method comprising:
    acquiring, based on a pixelwise disparity of an input image estimated in a first network, a pixelwise plane parameter of the input image;
    determining a pixelwise segment matching probability of the input image based on a second network trained to perform a segmentation of an image;
    acquiring a segment-wise plane parameter by calculating a weighted sum of pixelwise plane parameter based on the pixelwise segment matching probability corresponding to each segment in the image; and
    detecting a planar surface in the input image based on the segment-wise plane parameter.

2. The method of claim 1, wherein the detecting of the planar surface in the input image comprises:
    acquiring pixelwise segment clustering information based on the pixelwise segment matching probability; and
    detecting the planar surface in the input image based on the segment-wise plane parameter and the pixelwise segment clustering information.

3. The method of claim 1, wherein the acquiring of the segment-wise plane parameter for each segment in the input image comprises:
    obtaining, based on the second network, the weighted sum of the pixelwise plane parameter based on the pixelwise segment matching probability corresponding to the corresponding segment; and
    acquiring a plane parameter of the corresponding segment based on the weighted sum of the pixelwise plane parameter.

4. The method of claim 1, wherein the first network and the second network are trained based on at least one of:
    a first loss associated with a probability that each pixel matches each segment, which is calculated based on a probability distribution of a plane parameter corresponding to each segment clustered based on the second network; or
    a second loss associated with a difference between a first image and an image obtained by converting a second image corresponding to the first image based on a disparity estimated in the first network to correspond to the first image.

5. The method of claim 1, wherein the acquiring of the pixelwise plane parameter comprises:
    determining the pixelwise disparity of the input image based on the first network; and
    acquiring the pixelwise plane parameter comprising a normal vector and distance information from the pixelwise disparity based on an intrinsic parameter of a camera that captures the input image.

6. A non-transitory computer-readable storage medium storing instructions that, when executed by a processor, cause the processor to perform the method of claim 1.

7. A learning method of a plane detection model, the learning method comprising:
    acquiring a pixelwise plane parameter of a first image included in training data based on a pixelwise disparity of the first image acquired by applying the first image to a first network;
    determining a pixelwise segment matching probability of the first image by applying the first image to a second network; and
    training the first network and the second network based on a first loss associated with a probability that each pixel of the first image matches each segment, which is calculated from a weighted sum of the pixelwise plane parameter based on pixelwise segment matching probability of the first image.

8. The learning method of claim 7, wherein the probability that each pixel of the first image corresponds to each segment is calculated based on the pixelwise plane parameter and a probability distribution of plane parameters corresponding to a number of segments.

9. The learning method of claim 8, wherein the probability distribution of the plane parameters corresponding to the number of segments comprises:
   a representative value of the plane parameters corresponding to the segments calculated based on the pixelwise segment matching probability and the pixelwise plane parameter; and
   a variance of the plane parameters corresponding to the segments calculated based on the pixelwise segment matching probability, the pixelwise plane parameter, and the representative value of the plane parameters corresponding to the segments.

10. The learning method of claim 7, wherein the training of the first network and the second network comprises:
    converting a second image captured at a different viewpoint from that of the first image based on a depth estimated to correspond to the first image in the first network; and
    training the first network and the second network based on the first loss and a second loss associated with a difference between the first image and an image obtained through the converting of the second image.

11. The learning method of claim 7, wherein the training data comprises at least one of:
    the first image corresponding to a first monocular image of a stereo image and a second image corresponding to a second monocular image of the stereo image; or
    the first image corresponding to a first frame of a video image and a second image corresponding to a second frame of the video image.

12. The learning method of claim 7, wherein the acquiring of the pixelwise plane parameter comprises:
    estimating the pixelwise disparity of the first image by applying the first image to the first network; and
    acquiring the pixelwise plane parameter comprising a normal vector and distance information from the pixelwise disparity based on an intrinsic parameter of a camera that captures the first image.

13. An apparatus for detecting a planar surface, the apparatus comprising:
    a processor configured to:
    acquire, based on a pixelwise disparity of an input image estimated in a first network, a pixelwise plane parameter of the input image;
    determine a pixelwise segment matching probability of the input image based on a second network trained to perform a segmentation of an image;
    acquire a segment-wise plane parameter by calculating a weighted sum of the pixelwise plane parameter based on the pixelwise segment matching probability corresponding to each segment in the image; and
    detect a planar surface in the input image based on the segment-wise plane parameter.

14. The apparatus of claim 13, wherein the processor is further configured to:
    acquire pixelwise segment clustering information based on the pixelwise segment matching probability; and
    detect the planar surface in the input image based on the segment-wise plane parameter and the pixelwise segment clustering information.

15. The apparatus of claim 13, wherein the processor is further configured to:
    obtain, based on the second network, the weighted sum of the pixelwise plane parameter based on the pixelwise segment matching probability corresponding to the corresponding segment; and
    acquire a plane parameter of the corresponding segment based on the weighted sum of the pixelwise plane parameter.

16. The apparatus of claim 13, wherein the first network and the second network are trained based on at least one of:
    a first loss associated with a probability that each pixel matches each segment, which is calculated based on a probability distribution of a plane parameter corresponding to each segment clustered based on the second network; or
    a second loss associated with a difference between a first image and an image obtained by converting a second image corresponding to the first image based on a disparity estimated in the first network to correspond to the first image.

17. The apparatus of claim 13, wherein the processor is further configured to:
    determine the pixelwise disparity of the input image based on the first network; and
    acquire the pixelwise plane parameter comprising a normal vector and distance information from the pixelwise disparity based on an intrinsic parameter of a camera that captures the input image.

18. An apparatus for detecting a planar surface, the apparatus comprising:
    a memory storing a plane detection model comprising a first network that estimates a disparity of an input image and a second network that performs a segmentation of the input image,
    wherein the plane detection model is trained based on:
    acquiring a pixelwise plane parameter of a first image included in training data based on a pixelwise disparity of the first image acquired by applying the first image to the first network;
    determining a pixelwise segment matching probability of the first image by applying the first image to the second network; and
    training the first network and the second network based on a first loss associated with a probability that each pixel of the first image matches each segment, which is calculated from a weighted sum of the pixelwise plane parameter of the first image based on the pixelwise segment matching probability of the first image.

19. The apparatus of claim 18, wherein the training of the first network and the second network comprises:
    converting a second image captured at a different viewpoint from that of the first image based on a depth estimated to correspond to the first image in the first network; and
    training the first network and the second network based on the first loss and a second loss associated with a difference between the first image and an image obtained through the converting of the second image.

20. The apparatus of claim 18, further comprising:
a processor configured to
apply an input image to the first network and acquire a pixelwise plane parameter of the input image based on a pixelwise disparity of the input image estimated in the first network;
apply the input image to the second network and acquire a pixelwise segment matching probability of the input image estimated in the second network;
acquire a segment-wise plane parameter based on the pixelwise plane parameter and the pixelwise segment matching probability; and
detect a planar surface included in the input image based on the segment-wise plane parameter.

\* \* \* \* \*